United States Patent [19]
Ando

[11] Patent Number: 5,817,414
[45] Date of Patent: Oct. 6, 1998

[54] WEATHER-STRIP FOR AUTOMOBILE

[75] Inventor: Yukimasa Ando, Obu, Japan

[73] Assignee: Takai Kogyo Kabushiki Kaisha, Aichi, Japan

[21] Appl. No.: 737,310

[22] PCT Filed: Aug. 30, 1996

[86] PCT No.: PCT/JP96/02478

§ 371 Date: Nov. 12, 1996

§ 102(e) Date: Nov. 12, 1996

[87] PCT Pub. No.: WO97/08005

PCT Pub. Date: Mar. 6, 1997

[30] Foreign Application Priority Data

Aug. 31, 1995 [JP] Japan .................................. 7-248369

[51] Int. Cl.$^6$ ...................................................... B32B 3/00
[52] U.S. Cl. .............................. 428/358; 428/31; 428/99; 428/36.1; 428/122; 428/188; 428/358; 296/93; 296/146.9; 264/167; 264/277; 156/245; 52/716.1; 52/716.5; 52/204.591
[58] Field of Search ..................................... 428/122, 358, 428/99, 36.1, 31, 76, 188; 52/716.1, 716.5, 716.6, 717.01, 204.591; 49/479.1, 490.1, 441, 404, 475.1; 296/146.9, 93, 146.7; 264/277, 146, 167, 239; 156/245, 228

[56] References Cited

U.S. PATENT DOCUMENTS

| | | | |
|---|---|---|---|
| 4,969,293 | 11/1990 | Guillon | 49/441 |
| 5,072,546 | 12/1991 | Ogawa | 49/491 |
| 5,463,831 | 11/1995 | Shinagawa et al. | 49/377 |

FOREIGN PATENT DOCUMENTS

| | | |
|---|---|---|
| 5-4308 | 1/1993 | Japan . |
| 6-190895 | 7/1994 | Japan . |

*Primary Examiner*—Bruce H. Hess
*Assistant Examiner*—Abraham Bahta
*Attorney, Agent, or Firm*—Dennison, Meserole, Pollack & Scheiner

[57] ABSTRACT

A weather-strip to be mounted on an automobile door having a movable door glass including an elongated main body, and at least one lip provided on the main body and having a contact layer provided thereon. The contact layer has a thickened portion which may act as a practical contact part to contact a side surface of the movable door glass.

12 Claims, 6 Drawing Sheets

Figure 4:
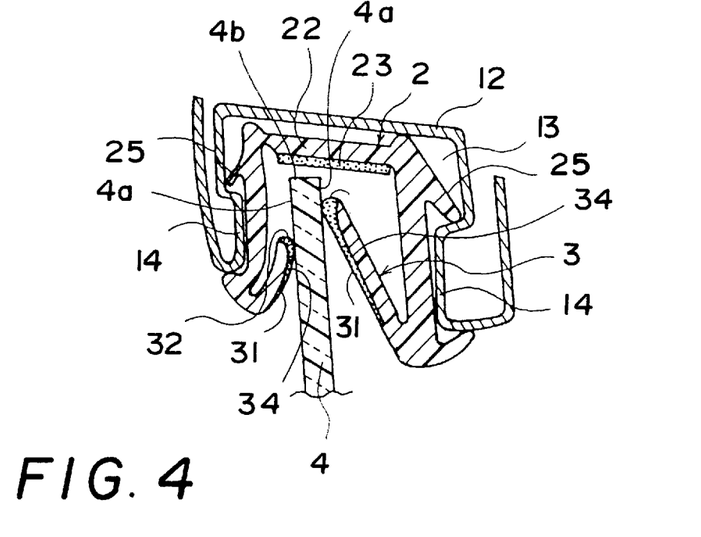
Figure 5:
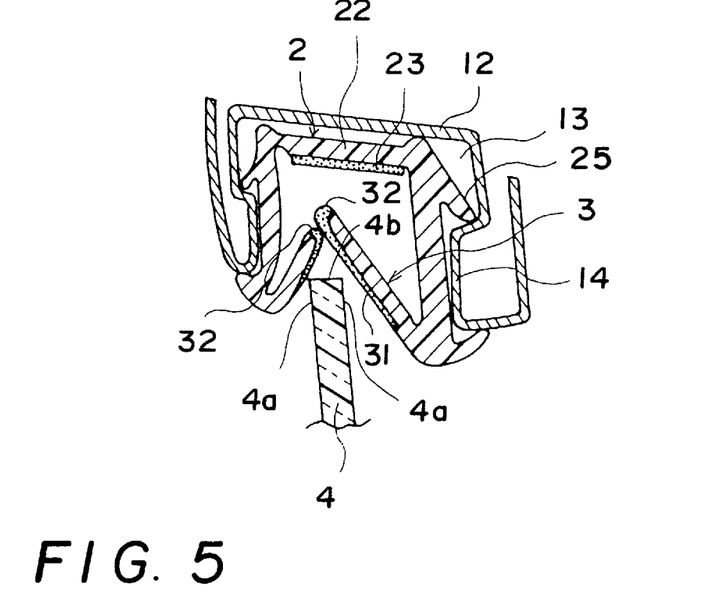

WEATHER-STRIP FOR AUTOMOBILE

TECHNICAL FIELD

The present invention relates to a weather-strip for an automobile, and more particularly, to a glass run or channeled weather-strip and a belt weather-strip which are mounted on an automobile door.

BACKGROUND ART

Generally, an automobile door includes a door frame, a door panel and a movable door glass movably received therein. The automobile door is provided with a weather-strip which contacts the movable door glass, that is, a glass run which is mounted on the door frame or a belt weather-strip which is mounted on the door panel. As will be appreciated, the weather-strip has a contact area to contact the movable door glass. The contact area of the weather-strip has to exhibit desired wear resistance since the movable door glass is frequently operated to close and open the same. Further, the contact area of the weather-strip is required to exhibit sufficient sealing performance with respect to the movable door glass. To increase the wear resistance and the sealing performance, the contact area of the weather-strip is provided with shaggy fabric such as nylon pile fabric, or coating of urethane, nylon and the like.

A conventional weather-strip for an automobile is shown, for example, in Japanese Laid-Open Patent Publications Nos. 5-4308 and 6-190895. The weather-strip is mainly constituted of a main body and lips which are formed of synthetic resin or thermoplastic elastomer having elasticity and shock absorbability. Each lip of the weather-strip includes a contact area to contact a movable door glass. The contact area is provided with a contact layer formed of wear resistive and lubricative synthetic resin such as polyolefine resin, so as to increase wear resistance thereof, slidability with respect to the movable door glass, and contact properties with respect to the movable door glass.

However, in the conventional weather-strip thus constructed, each contact layer is considerably worn with repeated operations of the movable door glass. As a result, the contact layer is thinned with time, thereby reducing sealing performance of the contact area. This may cause entry of rain water into a cab of the automobile. Moreover, when the contact layer is completely worn out, the contact area substantially loses its lubricative properties, thereby exhibiting reduced slidability with respect to the movable door glass. This may prevent smooth operations of the movable door glass.

DISCLOSURE OF INVENTION

It is an object of the invention to provide a weather-strip for an automobile which may withstand very frequent operations of a movable door glass, that is, to provide a weather-strip of which a contact area may keep its sealing performance and slidability with respect to a movable door glass for a long period of time even if a contact layer provided on the contact area is progressively worn with repeated operations of the movable door glass.

In order to attain the object, the present invention provides a weather-strip to be mounted on an automobile door having a movable door glass. The weather-strip includes an elongated main body, and at least one lip provided on the main body and having a contact layer provided thereon. The contact layer has a thickened portion which may act as an practical contact part to contact a side surface of the movable door glass.

With this weather-strip, the contact area of the weather-strip may keep its sealing performance and slidability with respect to the movable door glass for a long period of time, since the contact layer provided on the contact area has the thickened portion which may withstand many times of operations of the movable door glass.

The present invention will become more fully apparent from the claims and the description as it proceeds in connection with the drawings.

BRIEF DESCRIPTION OF DRAWINGS

FIG. 1 is a schematic illustration of a weather-strip for an automobile according to a first embodiment of the present invention;

FIG. 2 is a fragmentary enlarged cross-sectional illustration of a contact area of the weather-strip shown in FIG. 1;

FIG. 3 is a schematic illustration of an automobile door provided with the weather-strip shown in FIG. 1;

FIG. 4 is a sectional view taken along the line IV—IV of FIG. 3 in which a movable door glass is closed;

FIG. 5 is a view similar to FIG. 4 in which the movable door glass is opened;

FIG. 6 is a view similar to FIG. 4 showing a weatherstrip according to a second embodiment of the present invention;

FIG. 7 is a view similar to FIG. 4 showing a weatherstrip according to a third embodiment of the present invention;

FIG. 8 is a fragmentary enlarged cross-sectional illustration of a lip of a weather-strip according to a fourth embodiment of the present invention;

FIG. 9 is a view similar to FIG. 8 showing a lip of a weather-strip according to a fifth embodiment of the present invention;

FIG. 10 is a sectional view taken along the line X—X of FIG. 3 showing a weather-strip according to a sixth embodiment of the present invention; and FIG. 11 is a view similar to FIG. 10 showing a weather-strip according to a seventh embodiment of the present invention.

BEST MODES FOR CARRYING OUT THE INVENTION

Preferred embodiments of the invention will now be described in detail with reference to the drawings.

Referring to FIGS. 1 to 5, shown therein is a first embodiment of the invention. It is to be noted that in this embodiment, a glass run or channeled weather-strip is exemplified as a weather-strip. As shown In FIG. 3, the glass run 1 for an automobile is formed by extrusion molding and is configured to be mounted on a door frame 12 of an automobile door 11. As shown in FIG. 1, the glass run 1 includes an elongated main body 2 having a flared U-shaped configuration in transverse cross section and having a longitudinally extending guide channel to guide a peripheral edge of a door glass 4. The main body 2 has a substantially uniform cross-sectional configuration over the entire length thereof and is constituted mainly of a pair of opposed side walls 21 and a bottom wall 22 interconnecting the side walls 21. The glass run 1 also includes a pair of opposed lips 3 extending along the main body 2. The lips 3 are integrally formed with distal or upper ends of the side walls 21 of the main body 2 and have wedge-shaped peripheral edges. As will be apparent, the lips 3 project inwardly from the side walls 21 and incline to the bottom wall 22 at acute angles.

The lips 3 include contact areas on outer surfaces 34 thereof (upper surfaces of the lips 3 in FIG. 1) for contacting side surfaces 4a of the movable door glass 4. Each contact area of the lips 3 is provided with a contact layer 31 over the entire length and width thereof in a manner that total thickness of the lip 3 and the contact layer 31 is substantially equal. Also, the bottom wall 22 of the main body 2 includes a contact area on an inner surface 24 thereof (upper surface of the bottom wall 22 in FIG. 1) for contacting an upper end edge surface 4b of the movable door glass 4. Similarly, the contact area of the bottom wall 22 is provided with a contact layer 23. As shown in FIG. 5, the lips 3 are preferably arranged so that distal ends thereof contact each other when the glass run 1 is mounted on the door frame 12, except that the movable door glass 4 is closed. When the movable door glass 4 is closed, as shown in FIG. 4, the lips 3 are effectively flexed while the distal ends thereof contact the side surfaces of the movable door glass 4. Additionally, each side wall 21 is integrally provided with a hook 25 on a proximal end thereof. As will be appreciated, the hook 25 may act as a retainer for preventing the glass run 1 from slipping off from the door frame 12 (which will be described hereinafter).

Figure 1:
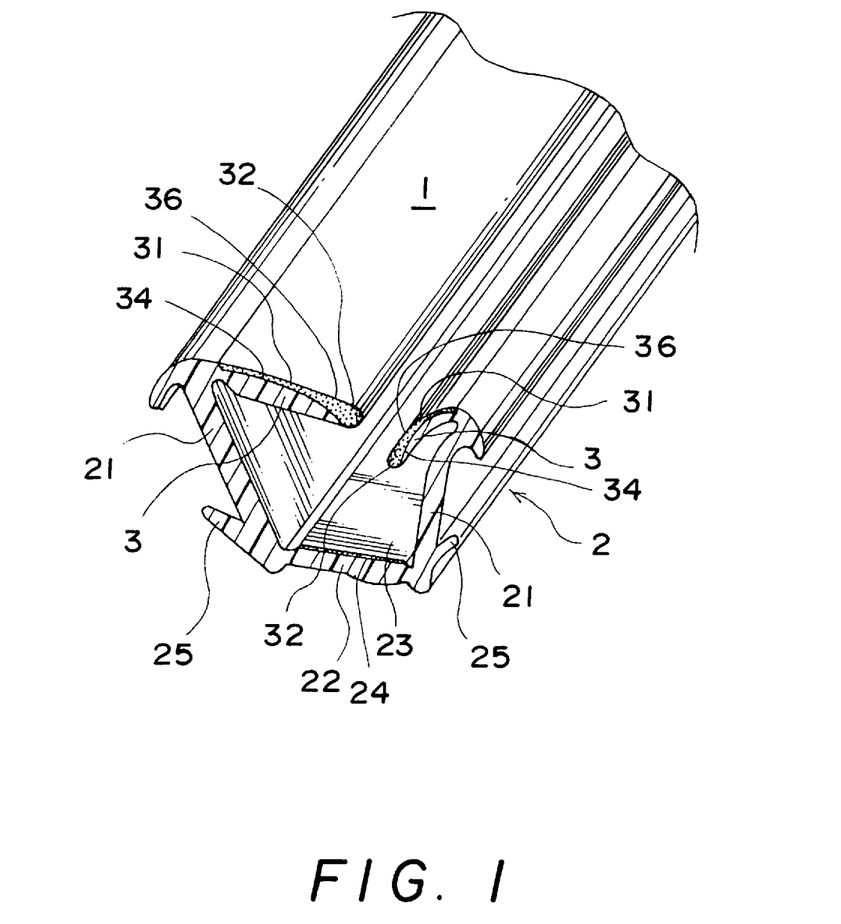

As shown in FIGS. 1, 4 and 5, each contact layer 31 includes a thickened portion 32 extending along the wedge-shaped peripheral edge of the lip 3. This is because the peripheral edge of the lip 3 has a wedge-shape configuration and because the lip 3 and the contact layer 31 have the uniform total thickness. As will be appreciated, the thickened portion 32 acts as a practical contact part which directly contacts the side surface 4a of the movable door glass 4, and is subjected to wearing action by the movable door glass 4.

Figure 2:
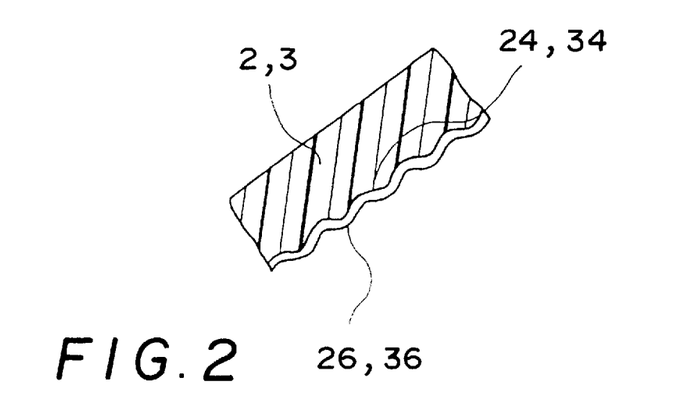
Figure 3:
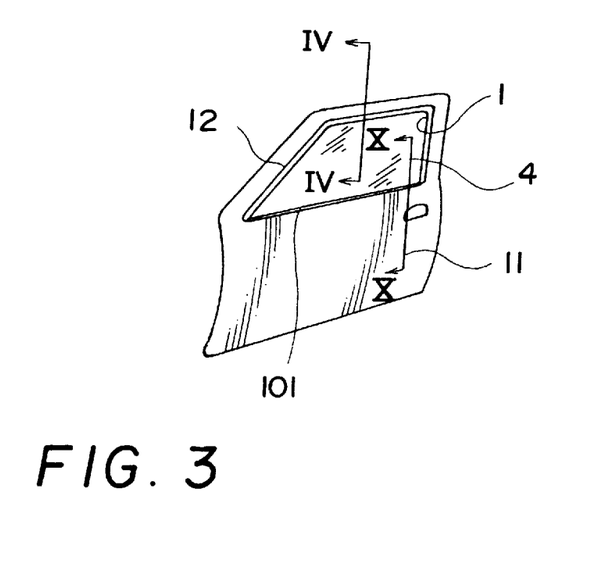

As shown in FIG. 2, the inner surface 24 of the bottom wall 22 and the outer surfaces 34 of the lips 3 are preferably formed to uneven or wrinkled surfaces having small irregularities, for example, sharkskin-like surfaces, so that such irregularities are reflected on an outer surface 26 of the contact layer 23 and outer surfaces 36 of the contact layers 31. As shown in FIGS. 4 and 5, the door frame 12 has a U-shaped configuration in transverse cross section and has an engagement groove 13 extending along the entire length thereof. As will be appreciated, the engagement groove 13 is configured to snugly receive the glass run 1. Also, the door frame 12 is formed with a pair of inwardly projecting portions 14 each of which is adapted to engage the hook 25 of the main body 2. When the glass run 1 is fitted in the engagement groove 13 of the door frame 12, the hooks 25 engage the projecting portions 14. Thus, the glass run 1 is reliably retained in the engagement groove 13 of the door frame 12.

The main body 2 and the lips 3 are formed of desired materials, for example, polyolefinic thermoplastic elastomer. The contact layers 23 and 31 are formed of desired lubricative synthetic resinous materials, for example, highly polymerized polyolefinic composition. Further, the contact layers 23 and 31 are simultaneously formed by coextrusion molding during extrusion molding of the main body 2 and the lips 3.

The operation of the glass run 1 mounted on the door frame 12 will now be described.

As shown in FIG. 5, the thickened portions 32 of the contact layers 31 of the lips 3 contact each other when the movable door glass 4 is lowered or opened. On the other hand, as shown in FIG. 4, the thickened portions 32 of the contact layers 31 contact the side surfaces 4a of the movable door glass 4 when the movable door glass 4 is upwardly moved or closed. Further, the contact layer 23 contacts the end edge surface 4b of the movable door glass 4 when the movable door glass 4 is moved to an uppermost position thereof (not shown).

As described above, the contact layers 31 provided on the contact areas of the lips 3 include the thickened portions 32 which may act as the substantial contact part. Thus, the contact areas of the lips 3 do not lose their lubricative properties and contact properties with respect to the movable door glass even if the thickened portion 32 is worn with time. This permits the contact areas of the lips 3 to stably keep their slidability and sealing performance with respect to the movable door glass 4 for a long period of time.

Referring now to FIGS. 6 to 9, shown therein are second to fifth embodiments of the invention. Each of these embodiments is partial modification of the first embodiment. Therefore, a construction which Is different from that in the first embodiment will be explained.

Figure 6:
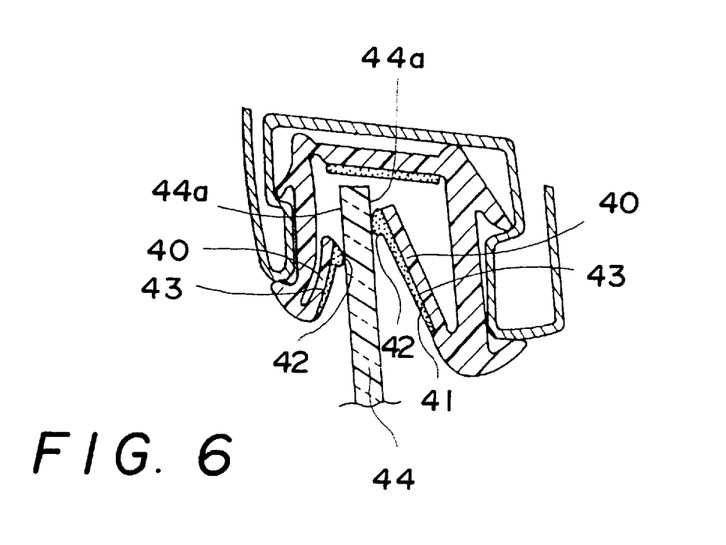

In the second embodiment, as shown in FIG. 6, each of lips 40 corresponding to the lips 3 of the first embodiment has an even thickness over the entire length thereof and includes no wedge-shaped peripheral edge. The lip 40 includes a contact area on an outer surface 43 thereof to contact a side surface 44a of a movable door glass 44. The contact area of the lip 40 is provided with a contact layer 41 extending over the entire extent thereof. As clearly shown in FIG. 6, the contact layer 41 includes a protuberance extending along a periphery thereof, thereby forming a thickened portion 42 extending along a peripheral edge of the lip 40. Further, the thickened portion 42 is acutely angled in cross section, so as to reduce an area of contact with the side surface 44a of the movable door glass 44. This may effectively reduce friction between the thickened portion 42 and the side surface 44a of the movable door glass 44.

Figure 7:
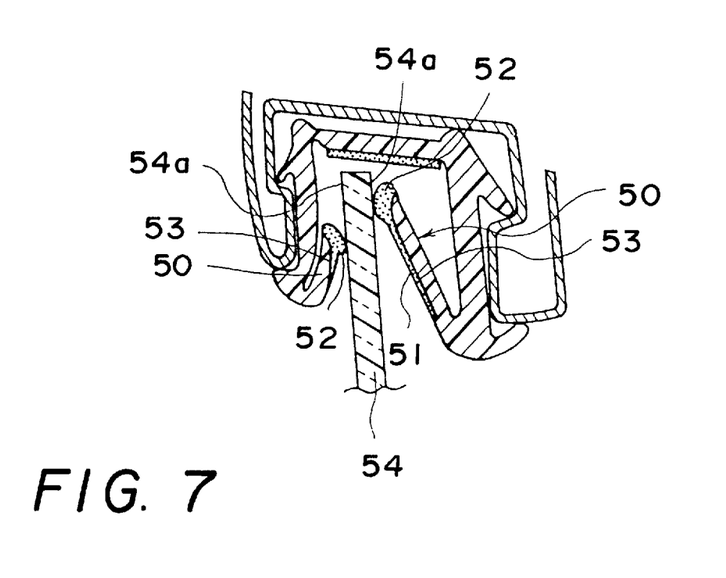

In the third embodiment, as shown in FIG. 7, each of lips 50 corresponding to the lips 3 of the first embodiment has a wedge-shaped peripheral edge. The lip 50 includes a contact area on an outer surface 53 thereof to contact a side surface 54a of a movable door glass 54. The contact area of the lip 50 is provided with a contact layer 51 extending over the entire extent thereof. As clearly shown in FIG. 7, the contact layer 51 includes a thickened portion 52 extending along the wedge-shaped peripheral edge of the lip 50. In addition, the thickened portion 52 includes a ridge extending therealong. The ridge is preferably rounded in cross section, so as to obtain a suitable area of contact with the side surface 54a of the movable door glass.

Figure 8:
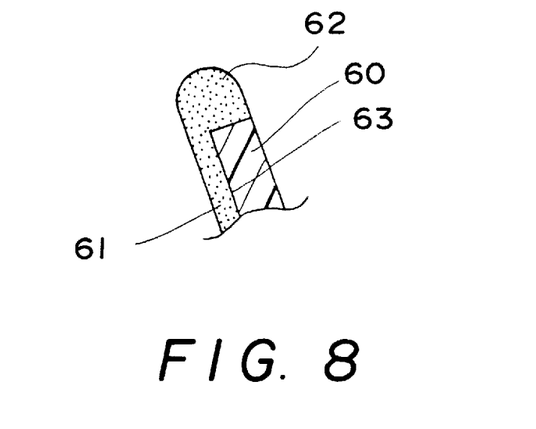

In the fourth embodiment, as shown in FIG. 8, each of lips 60 (one of which is shown) corresponding to the lips 3 of the first embodiment has an even thickness over the entire length and width thereof and includes no wedge-shaped peripheral edge. The lip 60 includes a contact area on an outer surface 63 thereof. The contact area of the lip 60 is provided with a contact layer 61 extending over the entire extent thereof. As clearly shown in FIG. 8, the contact layer 61 includes a thickened portion 62 which is formed in a manner to hang over a peripheral end surface of the lip 60.

Figure 9:
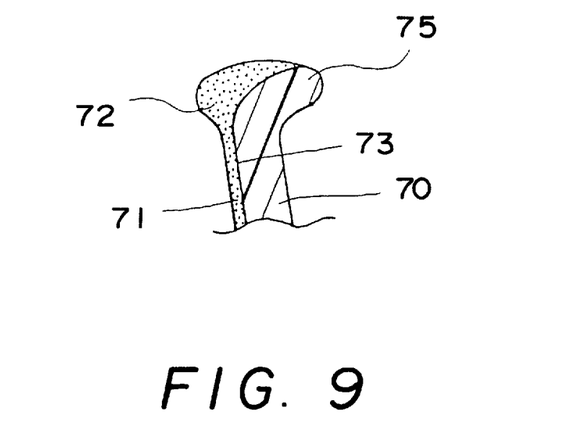

In the fifth embodiment, as shown in FIG. 9, each of lips 70 (one of which is shown) corresponding to the lips 3 of the first embodiment has an even thickness over the entire length and width thereof and has a bent end portion 75 extending along a peripheral edge thereof. The lip 70 includes a contact area on an outer surface 73 thereof. The contact area of the lip 70 Is provided with a contact layer 71 extending over the entire extent thereof. As clearly shown in FIG. 9, the contact layer 71 includes a thickened portion 72 extending along the bend end portion 75 of the lip 70. In addition, like the third embodiment, the thickened portion 72 includes a ridge extending therealong. The ridge is preferably rounded in cross section, so as to obtain a suitable area of contact with a movable door glass (not shown). In such a construction, the bent end portion 75 effectively prevent the lip 70 from excessively flexing, thereby permitting a suitable contact between the thickened portion 72 and a movable door glass (not shown).

In each embodiment described above, the thickened portion extends along the peripheral edge of the lip. It is to be noted, however, that the thickened portion may extend near the middle area of the lip. Moreover, the thickened portion may have a wide spread extending from the peripheral edge to the middle area of the lip.

Figure 10:
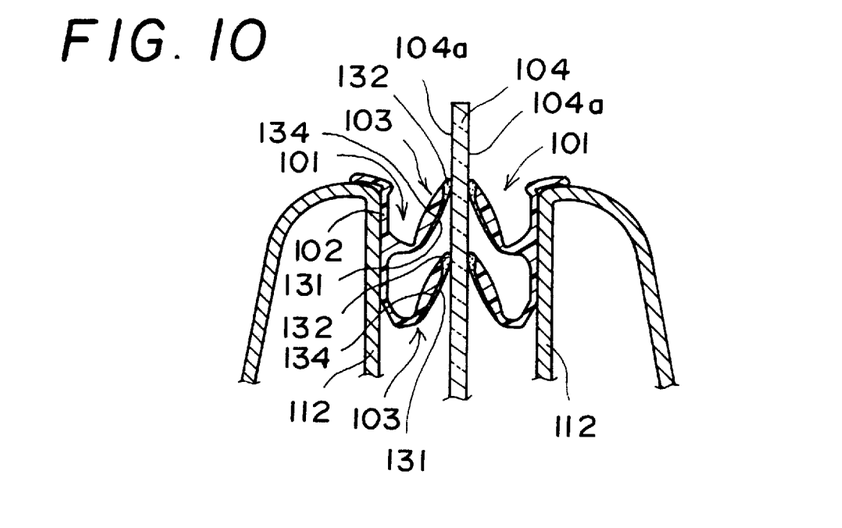

Referring to FIG. 10, shown therein is a sixth embodiment of the invention. It is to be noted that in this embodiment, a pair of belt weather-strips are exemplified as a weather-strip. Further, since the belt weather-strips 101 are of substantially mirror images, only one of the weather-strips 101 will be described. The belt weather-strip 101 for an automobile is formed by extrusion molding and is configured to be mounted on a door panel 112 of an automobile door. The weather-strip 101 includes an elongated main body 102 having a strip-like configuration. The main body 102 has a substantially uniform cross-sectional configuration over the entire length thereof. The weather-strip 101 also includes a pair of juxtaposed lips 103 extending along the main body 102. The lips 103 are integrally formed with a side surface of the main body 102 and have wedge-shaped peripheral edges. As will be apparent, the lips 103 project from the side surface of the main body 102 and incline upwardly at acute angles.

The lips 103 include contact areas on outer surfaces 134 thereof (lower surfaces of the lips 103 in FIG. 10) for contacting a side surface 104a of the movable door glass 104. Each contact area of the lips 103 is provided with a contact layer 131 over the entire length and width thereof in a manner that total thickness of the lip 103 and the contact layer 131 is substantially uniform.

The belt weather-strip 101 is mounted on an upper periphery of the door panel 112 by a conventional fastener, such as a clip, a staple and an adhesive tape (not shown). As will be appreciated, when the belt weather-strip 101 is mounted on the door panel 112, the lips 103 are effectively flexed so that the contact layers 131 contact the side surface 104a of the movable door glass 104.

Each contact layer 131 includes a thickened portion 132 extending along the peripheral edge of the lip 103. This is because the peripheral edge of the lip 103 has a wedge-shape configuration and because the lip 103 and the contact layer 131 have the uniform total thickness. As will be appreciated, the thickened portion 132 acts as a practical contact part which directly contacts the side surface 104a of the movable door glass 104, and is subjected to wearing action by the movable door glass 104.

The main body 102 and the lips 103 are formed of desired materials, for example, polyolefinic thermoplastic elastomer. The contact layers 131 are formed of desired lubricative synthetic resinous materials, for example, highly polymerized polyolefinic composition. Further, the contact layers 131 are simultaneously formed by coextrusion molding during extrusion molding of the main body 102 and the lips 103.

The operation of the belt weather-strip 101 mounted on the door panel 112 is similar to that of the glass run 1 of the first embodiment. Accordingly, the explanation thereof is omitted.

Figure 11:
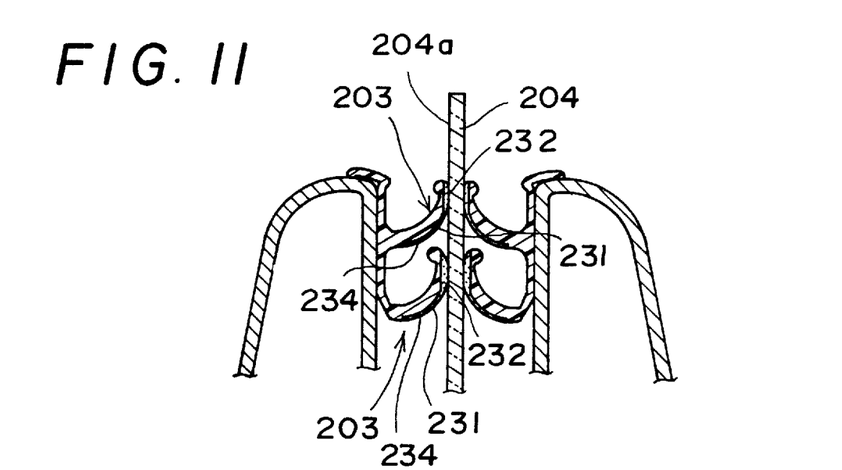

Referring now to FIG. 11, shown therein is a seventh embodiment of the invention. The embodiment is partial modification of the sixth embodiment. Therefore, a construction which is different from that in the sixth embodiment will be explained.

As shown in FIG. 11, in the seventh embodiment, each of lips 203 corresponding to the lips 103 of the sixth embodiment has an arcuate configuration in cross section and has a band-like flattened portion extending therealong. As is clearly shown in FIG. 11, the flattened portion has a wide spread extending from the peripheral edge to the middle area of the lip 203. The lip 203 includes a contact area on an outer surface 234 thereof to contact a side surface 204a of a movable door glass 204. The contact area of the lip 203 is provided with a contact layer 231 extending over the entire extent thereof. Furthermore, the contact layer 231 includes a thickened portion 232 extending along the flattened portion of the lip 203. As will be appreciated, the thickened portions 232 has a wide spread corresponding to that of the flattened portion of the lip 203.

In the embodiments described above, the main body and the lips are formed of the thermoplastic elastomer. Further, the contact layers are formed of the lubricative synthetic resinous materials such as the highly polymerized polyolefinic composition. However, the main body and the lips may be formed of other materials, for example, thermoplastic olefin resin (TPO) and soft PVC (vinyl chloride resin) having a JIS (Japanese Industrial Standard) A hardness from 60° to 80°. Moreover, the contact layers may be formed of superiorly adhesive lubricative materials, for example, thermoplastic olefin resin (TPO) having a Shore D hardness of 50° and containing powdered Teflon.

According to each weather-strip thus constructed, the contact areas of the lips of the weather-strip may keep their sealing performance and slidability with respect to the movable door glass for a long period of time, since the contact layers provided on the contact areas have the thickened portions which may withstand many times of operations of the movable door glass. This may lead to increase of reliability of the guide molding.

The preferred embodiments herein described are intended to be illustrative of the invention and not to limit the invention to the precise form herein described. They are chosen and described to explain the principles of the invention and their application and practical use to enable others skilled in the art to practice the invention.

I claim:

1. A weather-strip to be mounted on an automobile door having a movable door glass, comprising:

an elongated main body; and at least one lip provided on said main body and having a distinct contact layer of lubricative resinous material provided thereon, said contact layer having a localized thickened portion defining an effective contact part engageable with a side surface of the movable door glass and proving an enhanced resistance to wear of said contact layer at said contact part.

2. The weather-strip as defined in claim 1, wherein said main body has a substantially U-shaped configuration in transverse cross section and has a pair of opposed side walls and a bottom wall interconnecting said side walls, wherein said at least one lip is integrally formed with a distal end of one of said side walls so as to project inwardly therefrom to a peripheral edge, and wherein said thickened portion extends along said at least one lip adjacent said peripheral edge.

3. The weather-strip as defined in claim 2, wherein said thickened portion of said contact layer includes a projective ridge extends therealong.

4. The weather-strip as defined in claim 3, wherein said thickened portion of said contact layer extend over the peripheral end surface of said at least one lip.

5. The weather-strip as defined in claim 2, wherein said thickened portion of said contact layer extends over the peripheral end surface of said at least one lip.

6. The weather-strip as defined in claim 2, wherein said at least one lip includes a bent portion extending along the peripheral edge thereof.

7. The weather-strip as defined in claim 2, wherein said at least one lip is two in number, and wherein said lips are formed with distal ends of said side walls so as to project inwardly therefrom.

8. The weather-strip as defined in claim 1, wherein said main body has a substantially strip-like configuration, wherein said at least one lip is Integrally formed with a side surface of said main body, and wherein said thickened portion extends along said at least one lip.

9. The weather-strip as defined in claim 8, wherein said thickened portion of said contact layer extends over the peripheral end surface of said at least one lip.

10. The weather-strip as defined in claim 8, wherein said thickened portion of said contact layer has a wide spread extending from the peripheral edge to the middle area of said at least one lip.

11. The weather-strip as defined in claim 8, wherein said at least one lip is two in number, and wherein said lips are juxtaposed on said side surface of said main body.

12. The weather-strip as defined in claim 1, wherein said main body and said at least one lip are formed of thermoplastic elastomer by extrusion molding, and wherein said contact layer of lubricative synthetic resinous is a highly polymerized polyolefinic composition, said contact layer being simultaneously formed by coextrusion molding during the extrusion molding of said main body and said at least one lip.

* * * * *